US008270896B2

(12) United States Patent
Shamain et al.

(10) Patent No.: US 8,270,896 B2
(45) Date of Patent: Sep. 18, 2012

(54) SYSTEMS AND METHOD FOR FREQUENCY BASED SATELLITE CHANNEL SCANNING

(75) Inventors: Prasad Shamain, San Diego, CA (US); Chi-Ping Nee, Santee, CA (US); Gadi Kalit, Nahariya (IL)

(73) Assignee: Conexant Systems, Inc., Newport Beach, CA (US)

( * ) Notice: Subject to any disclaimer, the term of this patent is extended or adjusted under 35 U.S.C. 154(b) by 757 days.

(21) Appl. No.: 12/298,512

(22) PCT Filed: May 1, 2006

(86) PCT No.: PCT/US2006/016721
§ 371 (c)(1), (2), (4) Date: Jun. 23, 2009

(87) PCT Pub. No.: WO2007/133190
PCT Pub. Date: Nov. 22, 2007

(65) Prior Publication Data

US 2010/0003915 A1 Jan. 7, 2010

(51) Int. Cl.
*H04H 20/74* (2008.01)
*H04H 20/71* (2008.01)
*H04H 40/00* (2008.01)
*H04B 1/18* (2006.01)

(52) U.S. Cl. .................. 455/3.02; 455/3.01; 455/161.3; 455/180.1; 455/3.06

(58) Field of Classification Search ................ 455/3.02, 455/12.1, 13.1, 3.01, 3.06, 161.1, 180.1
See application file for complete search history.

(56) References Cited

U.S. PATENT DOCUMENTS

| | | | | | |
|---|---|---|---|---|---|
| 5,585,803 | A * | 12/1996 | Miura et al. | | 342/372 |
| 5,694,416 | A * | 12/1997 | Johnson | | 375/148 |
| 6,058,318 | A * | 5/2000 | Kobayakawa et al. | | 455/562.1 |
| 6,188,915 | B1 * | 2/2001 | Martin et al. | | 455/562.1 |
| 6,810,233 | B2 * | 10/2004 | Patsiokas | | 455/3.02 |
| 7,280,164 | B2 * | 10/2007 | Yen | | 348/732 |
| 7,383,018 | B2 * | 6/2008 | Knutson et al. | | 455/3.02 |
| 7,401,349 | B2 * | 7/2008 | Knutson et al. | | 725/64 |
| 2002/0058475 | A1 * | 5/2002 | Patsiokas | | 455/3.02 |
| 2002/0154520 | A1 * | 10/2002 | Mercier | | 363/21.07 |
| 2002/0163821 | A1 * | 11/2002 | Odell | | 363/56.11 |
| 2003/0163820 | A1 * | 8/2003 | Knutson et al. | | 725/63 |
| 2003/0163822 | A1 * | 8/2003 | Knutson et al. | | 725/68 |
| 2004/0004933 | A1 * | 1/2004 | Zhu et al. | | 370/203 |
| 2004/0004934 | A1 * | 1/2004 | Zhu et al. | | 370/208 |
| 2004/0004935 | A1 * | 1/2004 | Zhu et al. | | 370/208 |
| 2004/0005018 | A1 * | 1/2004 | Zhu et al. | | 375/340 |
| 2004/0005022 | A1 * | 1/2004 | Zhu et al. | | 375/365 |
| 2005/0078225 | A1 * | 4/2005 | Yen | | 348/732 |

* cited by examiner

*Primary Examiner* — Tilahun B Gesesse
(74) *Attorney, Agent, or Firm* — Jackson Walker L.L.P.; Christopher J. Rourk

(57) ABSTRACT

A satellite signal demodulator is configured to use frequency-based channel scanning to sense the presence of a channel and to obtain the frequency profile of the channel. Once the channel is identified and the profile is obtained, channel extraction is used to identify the frequency parameters for a given channel. A coarse parameter estimation is performed to obtain a coarse estimate of the symbol rate (SR) and the center frequency ($f_c$) of the channel. The coarse estimation can then be followed by a fine estimation of the symbol rate and center frequency ($f_c$), using a bit tracking loop (BTL) lock indicator.

37 Claims, 6 Drawing Sheets

SYSTEMS AND METHOD FOR FREQUENCY BASED SATELLITE CHANNEL SCANNING

BACKGROUND

1. Field of the Invention

The embodiments described below relate to a low cost satellite signal demodulator, and more particularly to a low cost satellite signal demodulator that can be configured to sense the presence of a channel and obtain the frequency profile for the channel in a satellite broadcast system in which the channel parameters and the frequency occupancy are not fixed and/or predefined.

2. Background of the Invention

In a satellite television broadcast system, satellites orbiting the earth, receive television programming content from terrestrial transponders and transmit television programming content to terrestrial-based satellite receivers. The receivers receive the signals and pass them to a demodulator circuit typically included in a set up box that is located between the antenna and a television. The demodulator extracts the television programming and makes it available for viewing on the television.

Such satellites are configured to transmit television programming content for a particular satellite television system over a specified frequency spectrum. The frequency spectrum encompasses frequencies within a predefined overall bandwidth (BW), as illustrated in FIG. 1. The overall bandwidth (BW) is typically channelized, i.e., divided into a plurality of channels 102. Each channel 102 is defined by a center frequency ($f_c$) and a channel bandwidth (bw). In many satellite television broadcasting systems, the channel bandwidth (bw) and center frequency ($f_c$) are predefined and information related to these parameters is stored in the set up box. This channel information is then made available to the demodulator so that the demodulator can easily locate and lock on to the center frequency ($f_c$) for a given channel, and can decode information being received over that channel. For efficiency, the channel parameters described above, as well as other parameters such as the symbol rate (SR) and code rate (CR) for each channel, are predetermined and rarely changed. It will be understood, however, that information for many programming channels can be multiplexed onto a single channel.

In certain systems, however, both the channel assignment and the channel parameters can change almost without notice. For example, in certain free-to-air systems, the center frequency ($f_c$) assignment and channel bandwidths (bw) can change. Also, new transponders can appear and the old ones can go off the air. As a result, a conventional set up box demodulator will have difficulty receiving such satellite signals, because the demodulator will often be forced to scan the spectrum bandwidth (BW) in order to detect the channels 102 being used and the associated channel frequency profiles. Conventional demodulators use a time domain, iterative process in order to perform such searching. Unfortunately, such a time domain, iterative process is time-consuming and inefficient. Thus, in systems where the channel assignments and channel parameters are changing often, such time domain, iterative processes can be insufficient.

Thus, set up box manufacturers are essentially forced to design a custom demodulator for a system such as a free-to-air systems, where the channel assignments and parameters change frequently. Designing a custom demodulator, however, can raise costs and reduce manufacturing efficiencies. If the manufacturer does not design a custom demodulator, however, then the demodulator will be inefficient, and consume a prohibitive amount of time for channel scanning when used for systems in which the channel assignments, and channel parameters are not fixed and change often.

SUMMARY

A satellite signal demodulator is configured to use frequency-based channel scanning to sense the presence of a channel and to obtain the frequency profile of the channel. Once the channel is identified and the profile is obtained, channel extraction is used to identify the frequency parameters for a given channel.

In one aspect, a coarse parameter estimation is performed to obtain a coarse estimate of the symbol rate and the center frequency ($f_c$) of the channel. The coarse estimation can then be followed by a fine estimation of the symbol rate and center frequency ($f_c$), obtained by achieving the lock for the bit tracking loop.

In another aspect, the demodulator can be achieved by adding a few custom circuits to a conventional demodulator design.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
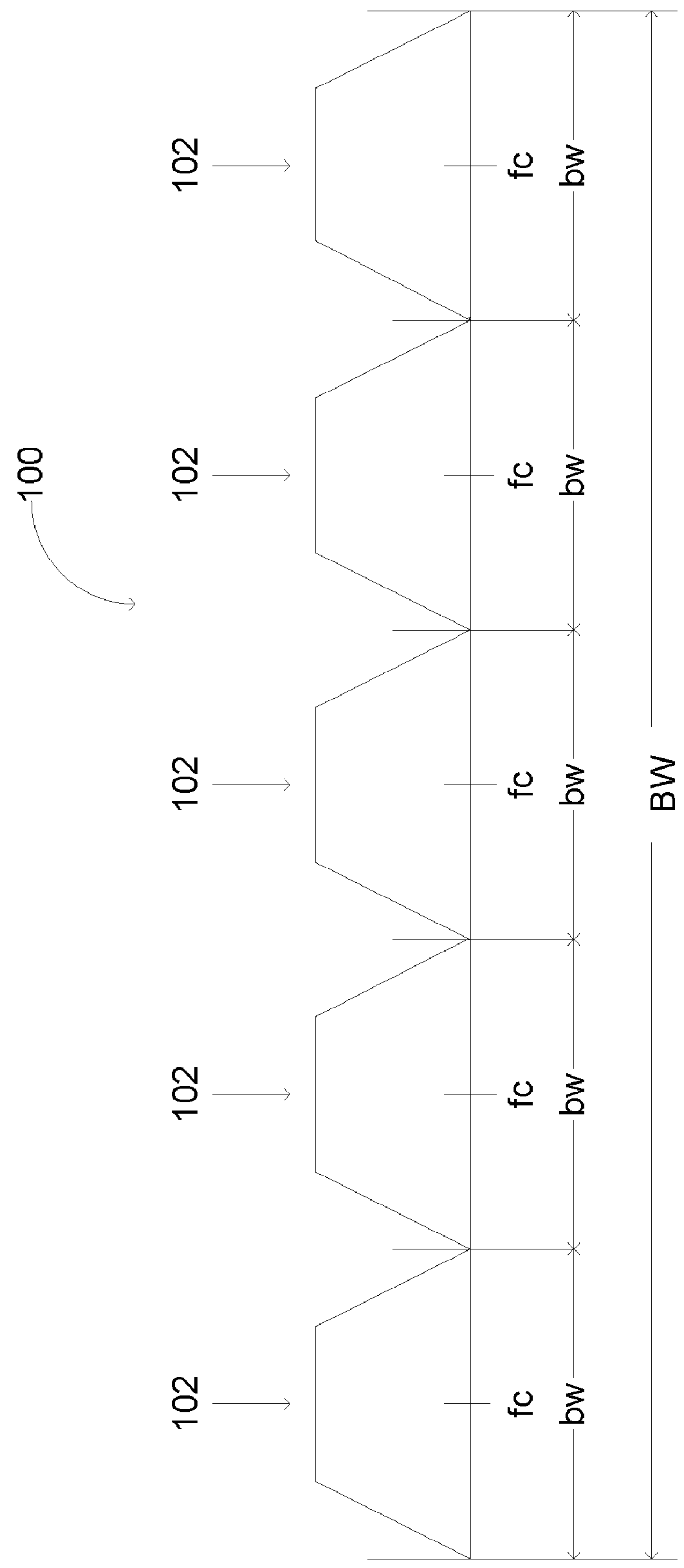
FIG. 1 is a diagram illustrating satellite broadcast channels for a particular satellite broadcast spectrum.

It will be understood that any dimensions, measurements, ranges, test results, numerical data, etc., are approximate in nature and unless otherwise stated not intended as precise data. The nature of the approximation involved will depend on the nature of the data, the context and the specific embodiments or implementations being discussed.

In the systems method described below, a satellite signal demodulator can be configured so that it can be operated as a type of spectrum analyzer. As will be explained in more detail below, a conventional satellite signal demodulator can be configured to operate as a spectrum analyzer by incorporating a small amount of additional circuits along with the control signal from a signal processors interfaced with the demodulator When the demodulator is configured to act as a spectrum analyzer, the demodulator can be controlled so as to sense the presence of a channel using a frequency-based approach. Once a particular channel is detected, a frequency profile for the channel can be obtained. For example, the frequency profile can comprise the power present in a band around a given frequency. Once the demodulator senses the presence of a channel and obtains the frequency profile, channel extraction can be performed in order to identify the frequency extent of the channel. A coarse parameter estimation can then be performed in order to obtain coarse estimates of the symbol rate (SR) and the center frequency ($f_c$). In certain embodiments, this coarse estimation can be followed by a fine estimation, which can be referred to as a process for confirming that demodulator is locked. In such a process, the estimated SR and $f_c$ are used to achieve channel tracking loop (CTL) lock, as well as bit tracking loop (BTL) lock. Once CTL lock and BTL lock are achieved, code rate estimation can be performed. In certain embodiments, the code rate estimation is performed by trying various code rates, e.g., by trial and error.

It should be noted that the systems and methods described below work on raised-cosine pulse power spectrums. For example, in a conventional digital video broadcast system, i.e., DVB-S, a transponder employs a square root, raised-cosine transmit filter with a roll-off factor of approximately 0.35. In other words, the power spectral density of each transponder is given by the raised-cosine pulse shape. The systems and methods described below take advantage of the frequency domain features of the raised-cosine pulse shape in order to perform the steps described below in relation to detecting a channel and determining the parameters associated therewith. It will be understood that any pulse shaping filter that has convex and concave frequency portions, e.g., Guassian Mean Shift Keying (GMSK), is amenable to the systems and methods described herein.

With the demodulator configured to operate as a spectrum analyzer, the demodulator can be figured to scan a frequency spectrum in order to detect the presence of a channel. For example, the demodulator can be configured to scan at fixed intervals and compare the power measured to the power measured at the previous interval. A threshold can be used to evaluate whether enough power has been detected to indicate a channel is present. Once the channel is detected, the demodulator can be configured to determine the frequency profile for the channel and perform channel extraction. A coarse estimation of the channel parameters can then be performed.

In certain embodiments, a curvature method is used to determine the channel parameters. In another embodiment, a half power point method is used to determine the channel parameters. Both methods, however, make use of a left point of inflection and a right point of inflection associated with the channel of the raised-cosine pulse shape. For a given channel, both left and right inflection points are unique.

Figure 2:
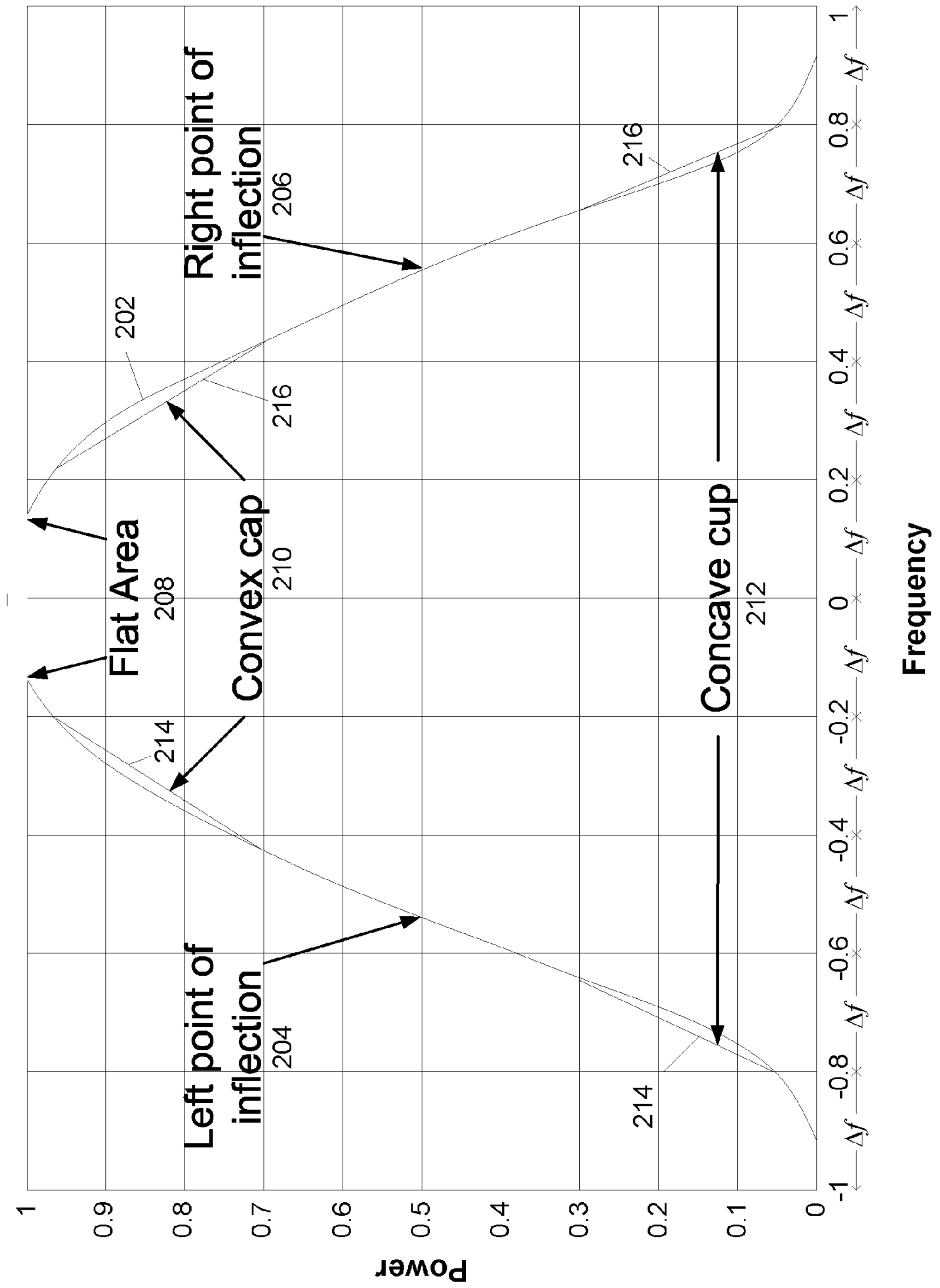
FIG. 2 is a diagram illustrating a raised cosine pulse power spectrum for a satellite broadcast channel.

FIG. 2 is a diagram illustrating a raised-cosine pulse shape associated with a particular channel. As can be seen, the raised-cosine pulse shape comprises a flat area 208 around the center frequency. The left point of inflection 204 and right point of inflection 206 are the points halfway up the left and right hand side of curve 202. These points can be detected by drawing line segment segments 214 and 216 and determining the point at which the line segment segments cross over curve 202 such that half of the line segment-segment lies above curve 212 and the other half lies below curve 212. Line segments 214 and 216 will be defined by concave cups 212 on the lower half of curve 202, where line segments 214 and 216 are above curve 202, as well as convex caps 210 in the upper portions of curve 202, where line segments 214 and 216 are below curve 202.

Figure 3:
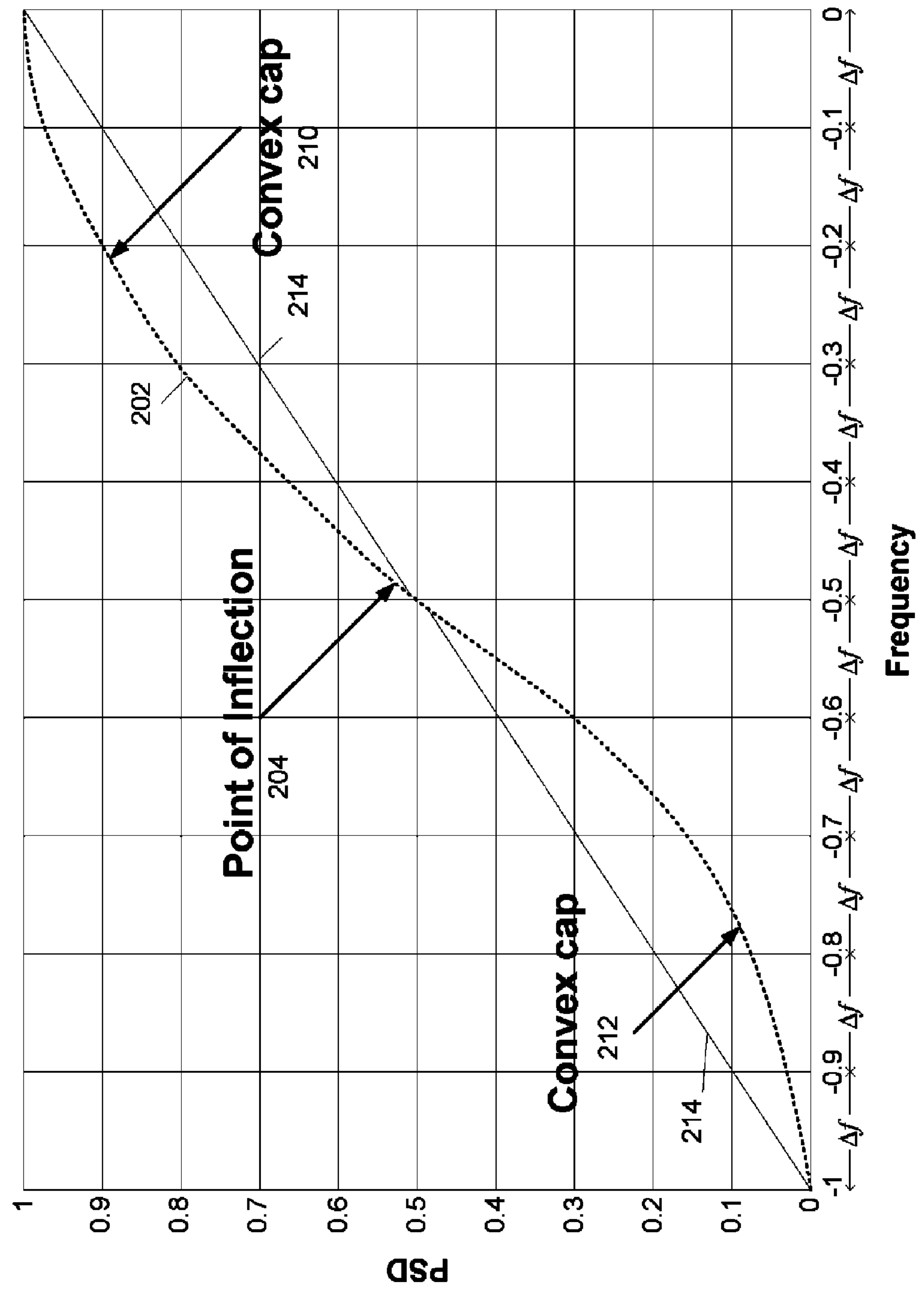
FIG. 3 is a diagram illustrating a close up view of a portion of the raised cosine pulse power spectrum of FIG. 2.

FIG. 3 is a diagram illustrating a closer view of the left hand side of curve 202 that more clearly illustrates left point of inflection 204, convex cap 210, and concave cup 212 for the left hand side of curve 202. Thus, the left inflection point is found where line 214 cross curve 202 so that half of line 214 is above curve 202 and half is below curve 202.

As illustrated at the bottoms of FIGS. 2 and 3, the demodulator can be configured to scan the spectrum at equal intervals of Δf. Accordingly, Δf should be less than or equal to the error that can be corrected by a BTL loop. For example, if a BTL can tolerate 500 ppm error for the SR estimate, then Δf should be less than or equal to the SR×500×$10^{-6}$.

Once a channel is detected, the curvature method uses the power measurement at three separate frequencies in order to determine the left point of inflection 204. These three frequencies can be defined as f_center−Δf, f_center, and f_center+Δf. The associated power at these three frequencies can be defined as power_left, power_center, and power_right. The left point of inflection 204 can then be tested using the following three equations: 1) If power_center>0.5*(power_left+power_right), then the demodulator is sampling in the area defined by concave cap 212; 2) If power_center<0.5*(power_left+power_right), then the demodulator is operating in the area defined by convex cap 210; and 3) If power_center=0.5*(power_left+power_right), then f_center is equal to the point of inflection 204.

Using three points as described above is one example embodiment of the methods to measure curvature, i.e., convex, concave or straight. In other embodiments, multiple readings, such as three sets of equi-spaced points, each set containing more than one power reading, in the frequency domain, can also be used to perform curvature test. For example, we can have six frequencies f1,f2,f3,f4,f5, and f6 such that 0.5*(f1+f2+f5+f6)=f3+f4. The actual implementation should allow for extra tolerance to ensure that the curvature is detected correctly.

It should be noted that with each curvature test, the frequency interval that must be tested is reduced by half. This provides significant efficiency and time savings when compared with conventional approaches.

In the half power point method, the average power across flat area 208 can be determined. An estimate of the half power point, i.e., left inflection point 204 can then be determined by scanning the power spectrum at a very fine interval, e.g., a 50 KHz interval. Depending on the embodiment, the fine interval can be approximately 10 KHz.

The curvature method has the advantage that the frequency interval is reduced by half after each test. The curvature method also provides better frequency accuracy as compared to the half power point method. The curvature method is susceptible to reduced power measurement accuracy at frequencies close to the point of inflection, and the curvature method also has a slower convergence rate.

Conversely, the half power point method has a greater frequency uncertainty—that is a function of the frequency step size. The half power point method also has a lower frequency accuracy, and is susceptible to errors in estimating the flat part of the spectrum; however, in the half power point method, the time spent for obtaining each frequency-power pair is fixed. As can be seen from Table 1 and Table 2, the HPP method is slower compared with the curvature method.

Once the left point of inflection 204 is determined, the right point of inflection 206 can also be determined. Although, it should be noted that determination of the processes for determining the left and right points of inflection can be independent of each other. The left and right points of inflection 204 and 206 define the 3 dB bandwidth for the channel. Once the left and the right inflection points (LIP and RIP) are obtained, the carrier frequency (CF) and the symbol rate (SR) can be calculated using the following formulas:

CF=(RIP+LIP)/2 and SR=(RIP−LIP)/2.

It should be noted, however, that the actual bandwidth occupancy is of secondary interest.

Table 1 illustrates example times for estimating the channel parameters using the curvature method described above. It should be noted that the estimation times include the AAGC time, curvature testing time, and the BTL/CTL lock time. Table 1 provides the results of a bit-exact computer simulation that includes a very specific way of accounting for the scanning time. It will be understood, therefore, that the estimations in table 1 are by way of example only and are only meant to illustrate the type of timing that can be achieved using the curvature method described herein.

TABLE 1

| SR (Msym/sec) | SR Estimate (Msym/sec) | Estimation time (microsec) |
|---|---|---|
| 2.819 | 2.812 | 202,000 |
| 1.124 | 1.151 | 345,000 |
| 15.346 | 14.822 | 125,000 |
| 40.354 | 40.405 | 120,000 |

Table 2 illustrates the timing associated with obtaining estimates using the half powerpoint method (HPP). Again, the estimated times include the AAGC, coarse power test time, and BTL/CTL lock time. And again, the estimates in Table 2 are by way of example only.

TABLE 2

| SR (MSym/sec) | CF (MHz) | SR Estimate (MSym/sec) | CF Estimate (MHz) | Estimation time (microsec) |
|---|---|---|---|---|
| 1.0345 | 3.455 | 1.100 | 3.450 | 1,818,814 |
| 1.415 | 6.978 | 1.500 | 6.950 | 1,700,981 |
| 13.125 | 2.879 | 13.350 | 2.925 | 40,188 |
| 40.929 | 5.654 | 41.700 | 5.700 | 68,505 |

As can be seen, estimates within the ASR range can be achieved fairly quickly using both methods.

In certain embodiments, after the signal rate and center frequency are estimated, the CTL and BTL can be loaded with the estimated values. CTL and BTL are well known and will not be explained in detail here for the sake of brevity. The CTL can be used to compensate for slight errors in the estimated center frequency and the BTL can be used to compensate for slight errors in the estimated SR. Typically, however, a BTL can only compensate for a small percentage of error in the estimated SR. For example, a conventional BTL can adjust for errors within the range of 500 ppm. In other words, a conventional BTL can only correct for the error between the estimated and actual symbol rates.

In certain embodiments, however, a BTL locking method can be used to provide SR compensation over a wider range, in less time, and with greater efficiency. The BTL locking method takes advantage of the fact that the demodulator is being operated as a demodulator as described above. Such a BTL locking method can be performed in systems that use some form of phase shift keying, such as quadrature phase shift keying.

Figure 6:
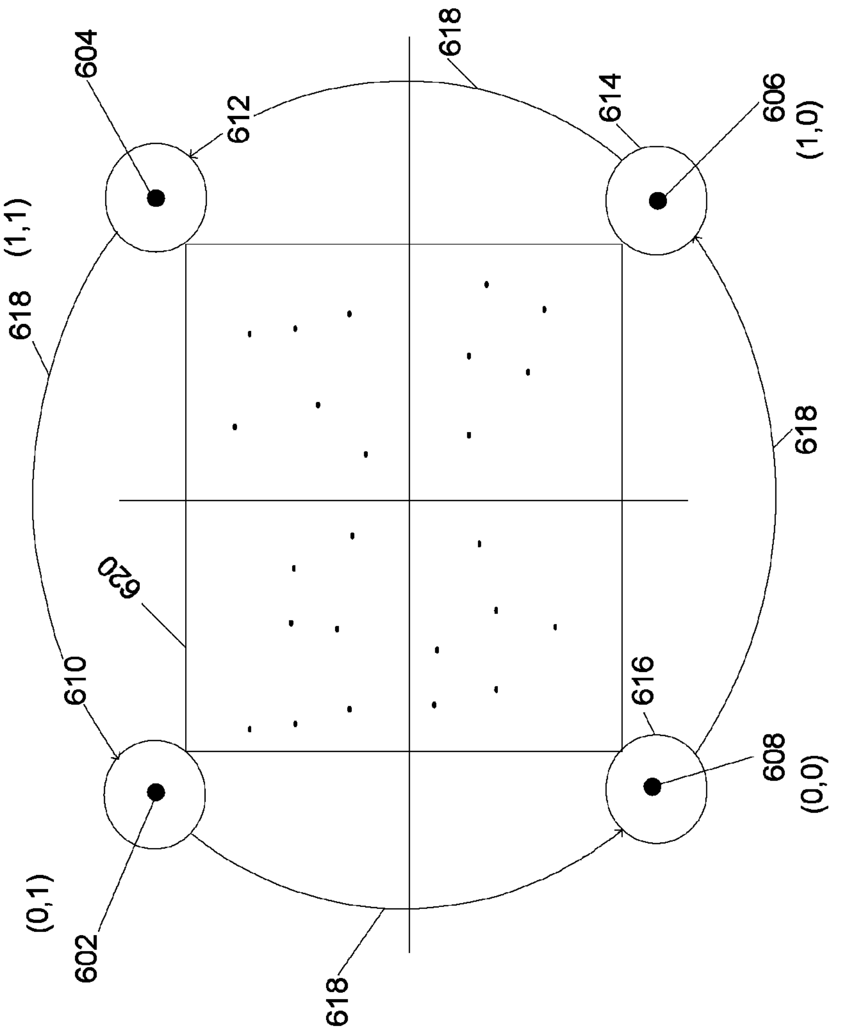
FIG. 6 is a diagram illustrating a phasor diagram for a system that employs quadrature phase shift key (QPSK) modulation.

FIG. 6 is a phasor diagram for a system that employs quadrature phase shift key (QPSK) modulation. The phasor diagram of FIG. 6 is representative of the output that will be seen by a spectrum analyzer looking at a demodulated QPSK signal. It will be understood that a QPSK system, each symbol is representative of 2-bits. Thus, a decoded symbol is capable of occupying 1 of 4 possible states. If there were no errors in the system, then these states would be represented by point 602, 604, 606, and 608. Each time a symbol is decoded it would fall directly on one of these points. The errors produced due to all white Gaussian noise (AWGN) result in the demodulated symbols actually occupying a cloud 610, 612, 614, or 616 around points 602, 604, 606, and 608 respectively.

If the demodulator is not tuned sufficiently close to the center frequency, then the phase of the decoded symbols will begin to rotate along path 618. A conventional CTL method is configured to adjust for errors in the estimated center frequency and allow the demodulator to lock on to the center frequency. A conventional BTL then goes through a process to adjust for errors in the estimated SR. This process, however, takes time.

In certain embodiments, a BTL locking method can be employed which significantly reduces the time to adjust for errors in the SR. If the estimated SR is off, then certain decoded symbols will appear, in the phasor diagram of FIG. 6, within area 620. A demodulator configured in accordance with the systems and methods described herein can be configured to simply determine how many symbols are falling within area 620. If the number of symbols falling within area 620 exceeds a certain acceptable threshold, then the demodulator can be shifted a predetermined step size in order to adjust for the symbol rate error.

Thus, the systems and methods described herein provide for a quick and efficient mechanism to perform BTL locking, i.e., a fine estimate of the symbol rate. Because the fine estimates of the center frequency and SR can be achieved quicker and more efficiently using the methods described above, these methods can even be used in systems where the center frequency and the SR are known with limited accuracy. In such systems, the methods for achieving fine estimates of the center frequency and SR can be used to speed up acquisition. In other words, fine estimates of the center frequency and SR can be provided to the rest of the demodulator in order to speed up the acquisition time for the demodulator.

Figure 5:
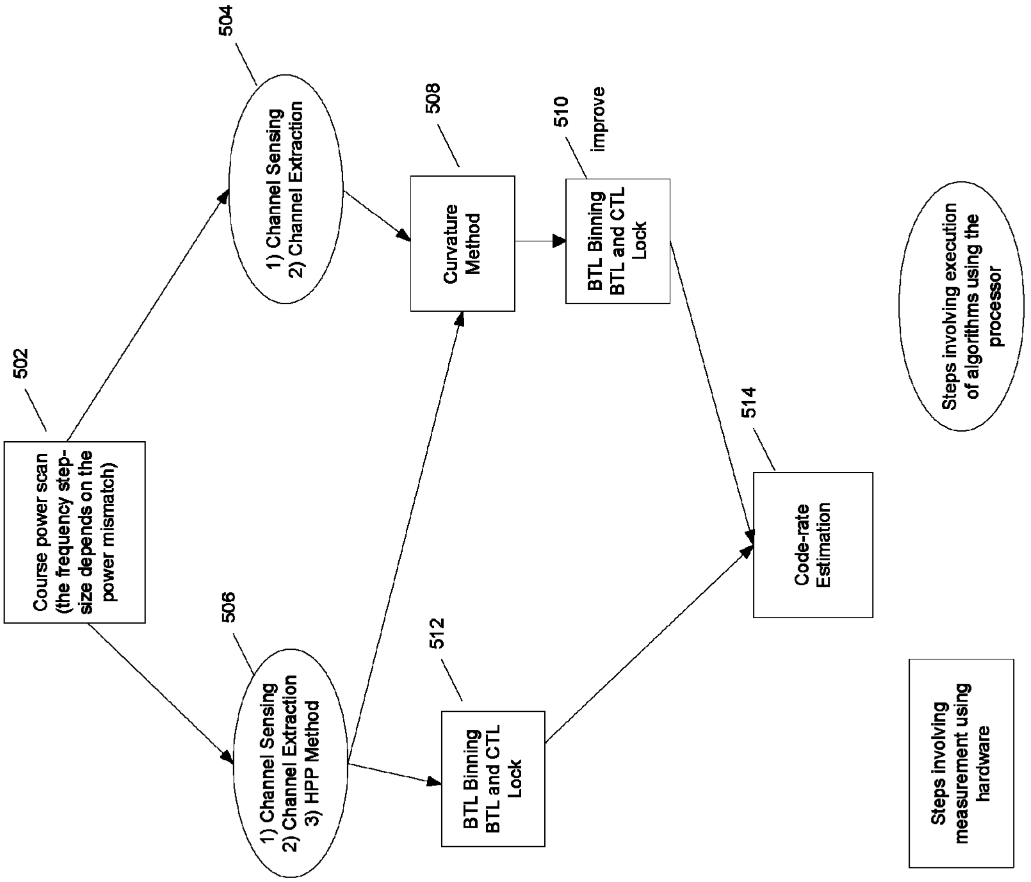
FIG. 5 is a flowchart illustrating exemplary channel sensing an extraction processes in accordance with a plurality of embodiments.

FIG. 5 is a diagram illustrating various methods for detecting the presence of a channel and determining the parameters associated with the channel in accordance with the systems and methods described herein. In one embodiment, a coarse power scan can be performed as step 502, this coarse power scan can then be followed by channel sensing and channel extraction in step 504. Once channel sensing and channel extraction are achieved in step 504, a coarse estimation of the channel parameters can be performed using the curvature method described above in step 508. After the coarse estimation of the channel parameters is performed in step 508, a fine estimation of the channel parameters using BTL and CTL can be performed in step 510. In certain embodiments, the BTL locking method described above can be used to achieve the fine estimates of the channel parameters in a quicker and more efficient manner. Once the fine estimates are obtained in step 510, the estimated SR can be used to perform code rate estimation in step 514.

In another embodiment, a coarse power scan of the step 502 can be followed by channel sensing, channel extraction, and a coarse estimate of the channel parameters using the half power point method in step 506. This can be followed by a fine estimate of the channel parameters using BTL and CTL in step 512. Again, the BTL locking method described above can be used to obtain the fine estimates in a quick and more efficient manner. Code rate estimation can then follow in step 514.

In still another embodiment, both the half power point method and curvature method can be used. For example, the coarse power scan in step 502 can be followed by channel sensing, channel extraction, and a coarse estimate of the channel parameters using the half power point method in step 506. This can then be followed by another coarse estimate using the curvature method in step 508. In this manner, the benefits of both methods can be obtained. A fine estimate can then be obtained in step 510 and code rate estimation can be performed in step 514. Again, the BTL locking method described above can be used to obtain fine estimates of the channel parameters in step 510 in a quick and more efficient manner.

As can be seen, certain steps in the flow chart of FIG. 5 are represented as boxes while other steps are represented as ovals. Depending on the embodiment, the steps illustrated as boxes can be performed using hardware in the demodulator, while the steps illustrated as ovals can be performed by execution of algorithms by a processor, such as a digital signal processor, microprocessor, or microcontroller.

Figure 4:
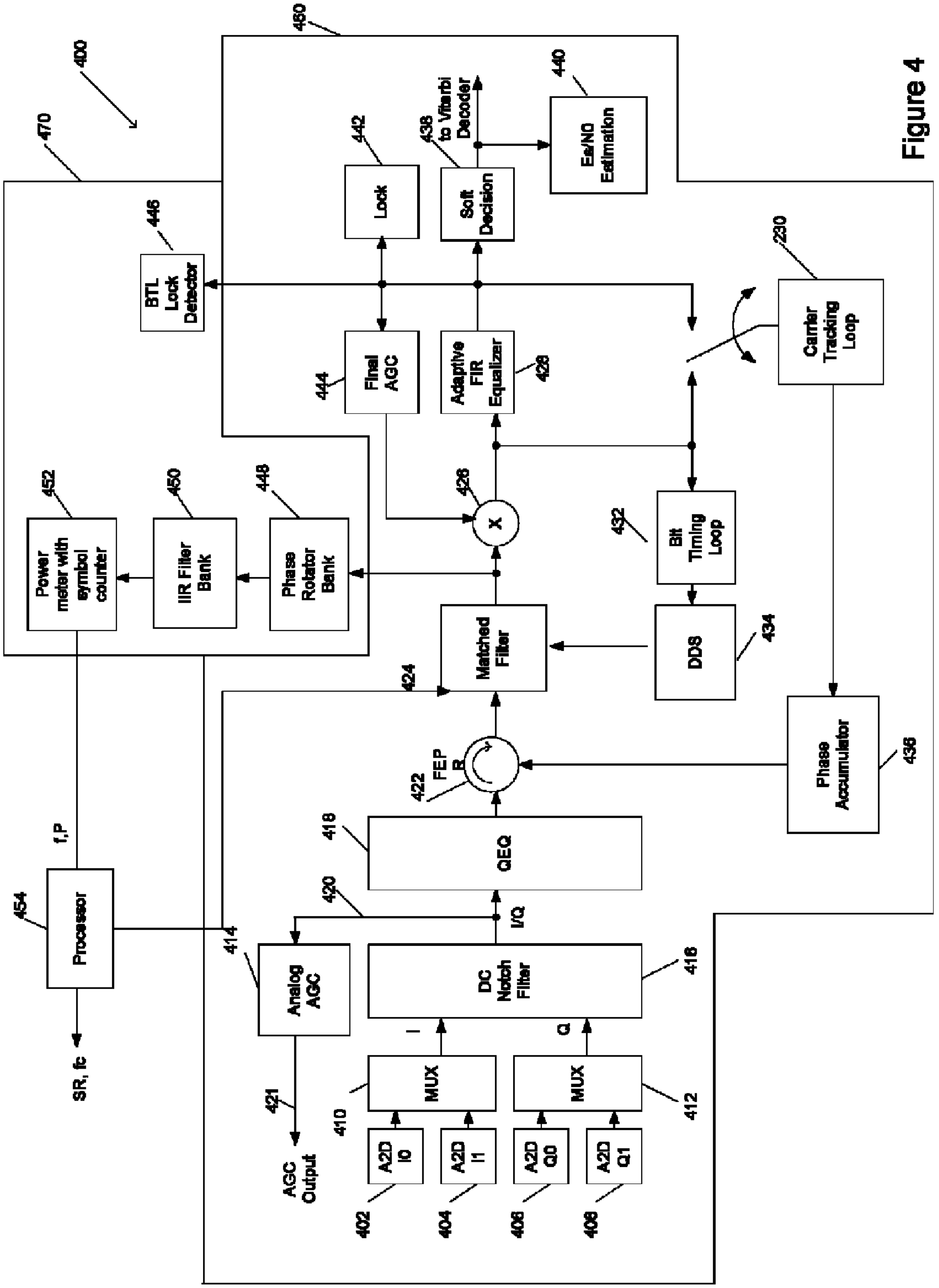
FIG. 4 is a diagram illustrating an example satellite signal demodulator configured in accordance with one embodiment.

FIG. 4 is a diagram illustrating a circuit 400 configured to perform the methods described above. Circuit 400 comprises three main parts. The three main parts include a demodulator 460, power measuring circuit 470, and processor 454. Demodulator 460 comprises components configured to perform typical demodulator functions. It will be understood that demodulator 460 and the components comprising demodulator 460 are present by way of example only and that the systems and methods described herein should not be seen as being limited to a specific type of demodulator or demodulator architecture. Rather, it will be clear that the systems and methods described herein can work with any compatible demodulator or demodulator architecture.

Power measuring circuit 470 comprises components that allow circuit 400 to perform as a spectrum analyzer, and the components necessary to perform the BTL lock detection functions described above. Processor 454 is configured to decode the outputs of power measuring circuit 470 in order to provide the estimates of the symbol rate and center frequency. As can be seen, processor 454 is also configured to control matched filter 424. As described above, processor 454 can control matched filter 424 in order to switch circuit 400 from a more conventional demodulation mode into a power scan mode using power measurement circuit 470.

Analog signals received from a satellite antenna are provided to analog to digital (A2D) circuits 402, 404, 406, and 408. In the example of FIG. 4, the signals received comprise an in-phase component and a quadrature phase component. Thus, the in-phase and quadrature phase signals are separated and provided to DC notch filter to 416 via multiplexers 410 and 412. Serial output 420 from DC notch filter 416, can then be provided to an analog AGC block 414 which provides an AGC output 421. AGC output 421 can be used to control automatic gain control blocks that are not illustrated in FIG. 4.

Due to bandwidth limitations for A2D circuits 402, 404, 406 and 408, the in-phase and quadrature phase signals must be split into two halves. One half of the in-phase signal is fed to A2D 402, while the other half is fed to A2D 404. Similarly, one-half of the quadrature signal is fed to A2D 406, while the other half is fed that A2D 408. Of course in other embodiments, there is no need to split the in-phase (I) and quadrature phase (Q) signals. Because a pair of A2D's are used for an individual I or Q signal, each A2D will need one DC notch filter, within DC notched filter 416, operating at one-half the sampling rate of the I and Q signals.

Because analog AGC block 414 follows DC notch filter 416, its operation is performed on 2's complement representation of the data instead of an offset binary representation. Analog AGC block 414 controls the level of the I and Q signals provided to A2D's 402, 404, 406 and 408. As noted, analog AGC block 414 obtains its input from the output of DC notch filter 416.

DC notch filter 416 is configured to remove the DC offset from the input I and Q signals. In certain embodiments, an offset binary to 2's complement converter (not shown) is placed between A2Ds 402, 404, 406 and 408 and DC notch filter 416. Accordingly, the input to DC notch filter 416 is 2's complement. It should be noted that due to multiplexes 410 and 412, two separate accumulators are required within DC notch filter 416.

The output of DC notch filter 416 is then provided to quadrature equalizer 418. Because the output from the A2Ds has been multiplexed before quadrature equalizer 418, the even samples will be from one A2D, e.g., A2D 402, and the odd samples will be from another A2D, e.g., A2D 404. In order to correct gain imbalances between even and odd samples, quadrature equalizer 418 is configured to store the even samples as reference to correct odd samples for the I and Q signals respectively.

The output of quadrature equalizer 418 is then provided to front end phase rotator 422. In certain embodiments, front end phase rotator 422 is configured to use look up tables so that signed table coefficients can be shared between the I and Q channels. The output of front end phase rotator 422 can be defined using the following equation:

$$I_{out} = \text{alpha} \times I_{in} + \text{data} \times I_{out}; \text{ and}$$

$$Q_{out} = -\text{data} \times I_{in} + \text{alpha} \times I_{out}.$$

The output of front end phase rotator 422 is then provided to matched filter 424. In certain embodiments, matched filter 424 comprises a FIR filter with dynamic coefficients chosen according to the 8 most significant bits of the output of the contents of DDS 434. The coefficients for matched filter 424 can then be stored in memory (not shown), such as a read only memory (ROM). Thus, at every sample clock, 8 coefficients $C_0$-$C_7$ can be read from coefficient banks in the memory and multiplied with the input I/Q signals and accumulated into $D_0$-$D_7$, respectively.

Depending on the embodiment, matched filter 424 can be configured to operate in one of two modes. One of these modes can be referred to as a DVB/DSS mode. In this mode, matched filter 424 can be configured to obtain the content of $D_7$, shift the content of $D_0$-$D_1$, $D_1$-$D_2$, etc., and then set $D_0$-0. In the other mode, which can be referred to as the DCII mode, matched filter 424 can be configured to obtain the content of $D_0$, shift the content of $D_1$-$D_2$, and $D_2$-$D_3$, etc., and then set $D_1$-0.

Matched filter 424 spans 8 symbol intervals and is simultaneously accumulating over an 8 symbol interval. An overflow indicator can indicate when a symbol boundary has been crossed. Therefore, when the overflow indicator is asserted, the output can be obtained from the accumulator that has finished accumulating over an 8 symbol interval, while the partial accumulated accumulators transit to next symbol intervals for further accumulation. The operation of matched filter 424 and the two modes described above differ only in the way the symbol information is accumulated as described above.

The coefficient banks stored in the memory, as described above, can comprise 256 components, and can be addressed by an 8-bit address. The 8-bit addresses can either be obtained from the most significant bits of DDS accumulator 434, or its inverse. It should be noted that DDS accumulator 434 provides an unsigned integer. Therefore, for example, if the address for tap 0 included in DDS accumulator 434 is x, then the address for tap 7 is 255−x. It will be understood that DDS accumulator 434 must comprise at least 8 taps, e.g., taps 0-7, in order to provide an 8-bit address.

DDS accumulator 434 can be used to generate both a symbol clock as well as the address for matched filter 424.

The output of matched filter 424 is provided to a multiplier 426. The other input to multiplier 426 can be provided from final AGC block 444. Final AGC block 444 can be configured to adjust gain fluctuation for the output of matched filter 424 that is due to different over-sampling ratios. Depending on the embodiment, final AGC block 444 can comprise two parts. The first part can be a multiplier and the second part can be a final AGC error metric and loop filter. Further, in certain embodiments final AGC block 444 and analog AGC block 414 can have similar architectures; however, the threshold and bandwidth of final AGC block 444 can be fixed, whereas the threshold and bandwidth of analog AGC block 414 can be variable. In fact, the AAGC and FAGC can have any combination of settings, either fixed or adjustable, depending on the embodiments.

The output of multiplier 426 can then be provided to bit timing loop 432 which can be configured to synchronize the symbol timing by adjusting DDS accumulator 434.

The output of multiplier 426 can also be provided to adaptive FIR filter 428, which can be configured to compensate for the inter-symbol interference (ISI) occurring in the channel. Depending on the embodiment, equalizer 428 can comprise three parts: an FIR filter, a decision and error block, and coefficient adoption circuitry.

In one example embodiment, the FIR filter component of equalizer 428 can comprise a three tap complex coefficient filter. The central tap coefficient can be set to 64, left shift by 6 bits, while the other coefficients, $C^I_0$, $C^I_1$, $C^Q_0$, and $C^Q_1$ are truncated from accumulators in the coefficient adaptation circuitry. The FIR filter can be configured to operate at a symbol rate. By symmetrically rounding and saturating the I and Q outputs of the FIR filter, the output of equalizer 428 can be obtained.

The architecture of the decision and error block can depend on the modulation scheme, e.g., BPSK, QPSK, 8PSK, etc. The output of the decision and error block, e.g., $I_{err}$ and $Q_{err}$, can be fed to the coefficient adaptation circuitry, as well as final AGC block 444.

The coefficient adaptation circuitry alternatively adapts two sets of coefficients, $C^I_0$, $C^Q_0$, and $C^I_1$, and $C^Q_1$. The coefficient adaptation circuitry generates a coefficient signal using a state machine. The coefficient adaptation signal is used to choose between the two taps. The coefficient adaptation circuitry then uses a signed bit of the content of the shift register in the FIR filter to multiply the error signals $I_{err}$ and $Q_{err}$ and then accumulates the product.

The output of equalizer 428 is provided to final AGC block 444. In addition, the output of equalizer 428 is provided to lock circuit 442. Lock circuit 442 can be configured to detect the locking condition for both acquisition and tracking. In acquisition mode, locking circuit 442 can be configured to determine whether the center frequency is correct. In tracking mode, lock circuitry 442 can be configured to indicate whether CTL is out of lock.

CTL 230 is configured to acquire and track the carrier frequency and its phase. It can be configured to generate a CTL output signal that is sent to phase accumulator 436. In certain embodiments, CTL 230 can be configured to alternatively take its input from the output of multiplier 426, or the output of equalizer 428.

In addition to demodulator 460, circuit 400 comprises power measurement block 470. Power measurement block 470 is simply configured to take the output of matched filter 424 and process it in much the same way as a spectrum analyzer. In order to place circuit 400 into a power measuring mode, processor 454 can be configured to control matched filter 424 so that it acts as an anti-alias filter. When matched filter 424 is configured to act as anti-aliasing filter, phase rotator bank 448 can be enabled. Phase rotator bank 448 can be configured to accept as single input, both I and Q, from the output of matched filter 424. Phase rotator bank 448 can further be configured to produce multiple outputs corresponding to various frequency rotations. The various frequency rotations can, e.g., be pre-specified. Phase rotator bank 448 can be configured to accept data from matched filter 424 at the matched filter clocking rate.

The output of phase rotator bank 448 can be passed to IIR filter bank 450. IIR filter bank 450 can comprise a bank of identical, double pole IIR filters, which can be configured to have a bandwidth equal to a fraction of the matched filter clocking rate. For example, in one embodiment, the bandwidth of the identical double pole IIR filters is equivalent to approximately 0.025 of the matched filter clocking rate. IIR filter bank 450 can be configured to low passed filter multiple streams of data provided from phase rotator bank 448.

The output of IIR filter bank 450 can then be passed to a power meter block 452. Power meter block 452 can comprise a set of power meter symbol counters and can be configured to measure the power in the multiple streams of data from IIR filter bank 450 over a given time. The given time can be measured in terms of the matched filter clocking rate.

The output of power meter block 452 is the power data corresponding to the input frequencies for the various scans performed on the input signals. The frequency and power data are fed to processor 454 which can be configured to generate the symbol rate and center frequency estimates in accordance with the methods described above.

In certain embodiments, power measurement block 470 can be configured to operate at a matched filter clocking rate, which is much less than the actual sampling rate. The additional clock cycles provided by operating power measurement block 470 at the matched filter clock rate can be used to parallelize the power measurement produced by power measurement block 470. For example, in the example implementation, the number of power-frequency measurements can be given by 80 divided by the matched filter clocking rate in megahertz. In other words, a 10 megahertz matched filter clocking rate can provide 8 parallel power measurements.

Thus, circuit 400 can be operated in one of two modes. The first mode can be a power scan mode configured to measure the power of the input signal in accordance with the methods described above. In this mode, circuit 400 is used as a spectrum analyzer. In this mode, the input bandwidth of an anti-aliasing filter preceding demodulator 460 can be set to a maximum, bit timing loop 432, CTL 230, lock circuit 442, and equalizer 422 are all disabled. Matched filter 424 can then be clocked at the matched filter clocking rate, e.g., by programming DDS accumulator 434, which is different from the symbol clocking rate. Matched filter 424 is then configured to act as an additional anti-aliasing filter, and phase rotator bank 448, IIR filter bank 450, and power meter bank 452 are enabled.

In the other mode, circuit 400 is configured to operate as a conventional demodulator. In this mode, phase rotator bank 448, IIR filter bank 450, and power meter bank 452 are disabled; however, BTL lock detector circuit 446 is enabled. Additionally, bit timing loop 432, CTL 230, lock circuit 442, and equalizer 428 are enabled.

In one example implementation, during the coarse estimation step, the anti-alias filter bandwidth can be set to 45 megahertz and the spectrum can be scanned with a step size of 1 megahertz over a non-overlapping band of 1 megahertz. In such an implementation, the matched filter clocking rate can be about 10 megahertz. The coarse scan will indicate the presence of a channel by measuring power. A very coarse estimate of the signal rate can also be achieved. This coarse estimate is on the order of +/−1 megahertz.

In order to sense the presence of a channel, a channel sensing algorithm can be performed by processor 454 in order to obtain an average noise floor. Any power that exceeds this noise floor by a predetermined threshold can be used to indicate the presence of a channel. This estimate can be used to narrow the anti-alias filter bandwidth in order to improve the accuracy of the power measurement in a subsequent finer scan. The finer scan can involve both scanning at a finer frequency resolution and measuring power at a finer level.

The channel parameters can then be estimated by processor 454 using algorithms such as those described above and using the assumption that a single channel is present. Accordingly, the bandwidth of the demodulator anti-aliasing filter should be just wide enough to allow for a single channel. Channel extraction algorithms can be performed by processor 454 to estimate the maximum frequency extent of the channel under consideration. These algorithms operate by identifying the features of a raised-cosine filter in the frequency domain, namely the rising and falling edges and the flat section. It should be noted that channel extraction can be challenging when a weak channel is flanked by stronger channels.

In the demodulation mode, BTL lock detector 446 can be enabled. As described above, BTL lock detector 446 can be configured to adjust for the errors in the symbol rate estimation. In certain instances, CTL 430 can indicate a lock even when bit timing loop 432 is not locked to the actual symbol rate. BTL lock detector 446 can be used to account the occurrences of the constellation points in square area centered around the origin as described above. If the estimated symbol rate is close to the actual symbol rate then the likelihood that a constellation point will fall within this area is small. Accordingly, BTL lock detector 446 can be configured to indicate a BTL lock; however, if the number of constellation points within the square area is above a certain threshold, then BTL lock detector 446 can be used to indicate such a condition and demodulator 460 can be adjusted, e.g., using a pre-determined step size. To adjust the demodulator, the estimated symbol rate is loaded in the DDS and then an attempt to achieve the BTL lock is made. If BTL lock is not achieved, then symbol rate binning, i.e., progressively taking multiple predetermined steps by incrementing/decrementing the symbol rate, can be attempted.

The output of adaptive FIR equalizer 428 is also provided to soft decision block 438, the output of which is provided to a Viterbi decoder, which is well known in the industry. The output of soft decision block 438 is also provided to an estimation block 440, which is configured to estimate the signal to noise ratio ($E_s/N_O$).

Circuit 400 can be used in digital video broadcast (DVB) systems, digital satellite service (DSS) systems, and DCII systems. Further, circuit 400 can be used for BPSK as well as QPSK systems.

It should be noted, that the BTL lock detection methods described above can actually be applied to any phase shift keying system. Thus, the embodiments described above in relation to the BTL lock detection should not be seen as limiting the systems and methods described to any particular implementation.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. In a satellite signal receiver comprising a demodulator, a power measurement circuit, and a processor, a method for frequency based channel scanning comprising:

placing the demodulator in a power scanning mode;

scanning the frequency spectrum to obtain power samples at a plurality of frequencies, until a channel is detected;

performing channel extraction once a channel is detected; and obtaining a coarse estimate of the channel parameters associated with the detected channel, wherein the detected channel comprises a flat area, a left point of inflection, and a right point of inflection, and wherein obtaining a coarse estimate comprises measuring the power at three separate frequencies in order to determine a left point of inflection for the channel.

2. The method of claim 1, wherein the three frequencies are defined as f_center−Δf, f_center, and f_center+Δf, and wherein the associated power of these three frequencies is defined as power_left, power_center, and power_right.

3. The method of claim 2, wherein the channel further comprises a concave cup region and a convex cap region, and wherein it is determined that the demodulator is sampling the channel in the concave cup region when power_center>0.5*(power_left+power_right).

4. The method of claim 2, wherein it is determined that the demodulator is operating in the convex cap region when power_center<0.5*(power_left+power_right).

5. The method of claim 2, wherein it can be determined that f_center is the left point of inflection when power_center=0.5 (power_left+power_right).

6. The method of claim 2, wherein the left inflection point is determined using multiple readings.

7. The method of claim 6, wherein the multiple readings comprise three sets of equi-spaced points, each set containing more than one power reading in the frequency domain.

8. The method of claim 1, wherein obtaining a coarse estimate comprises measuring the power at three separate frequencies in order to determine a right point of inflection for the channel.

9. The method of claim 8, wherein the three frequencies are defined as f_center−Δf, f_center, and f_center+Δf, and wherein the associated power of these three frequencies is defined as power_left, power_center, and power_right.

10. The method of claim 9, wherein the channel further comprises a concave cup region and a convex cap region, and wherein it is determined that the demodulator is sampling the channel in the concave cup region when power_center>0.5*(power_left+power_right).

11. The method of claim 9, wherein it is determined that the demodulator is operating in the convex cap region when power_center<0.5*(power_left+power_right).

12. The method of claim 9, wherein it can be determined that f_center is the left point of inflection when power_ center=0.5*(power_left+power_right).

13. The method of claim 9, wherein the right inflection point is determined using multiple readings.

14. The method of claim 13, wherein the multiple readings comprise three sets of equi-spaced points, each set containing more than one power reading in the frequency domain.

15. The method of claim 9, further comprising determining a channel bandwidth for the channel based on the left and right points of inflection.

16. The method of claim 15, further comprising determining a symbol rate for the channel based on the determined bandwidth.

17. The method of claim 15, further comprising determining a code rate for the channel based on the determined symbol rate.

18. The method of claim 1, wherein the channel comprises a raised-cosine pulse shape.

19. The method of claim 1, wherein the channel comprises concave and convex curvatures.

20. The method of claim 1, wherein the detected channel comprises a flat area, a left point of inflection, and a right point of inflection, and wherein determining a coarse estimate of the channel parameters comprises measuring the average power across the flat area and determining the left point of inflection by scanning the spectrum at a fine interval to find the frequency at which the power is half the average for the flat area.

21. The method of claim 20, wherein the fine interval is approximately 10 KHz.

22. The method of claim 20, wherein determining a coarse estimate of the channel parameters comprises measuring the average power across the flat area and determining the right point of inflection by scanning the spectrum at a fine interval to find the frequency at which the power is half the average for the flat area.

23. The method of claim 22, further comprising determining a channel bandwidth for the channel based on the left and right points of inflection.

24. The method of claim 23, further comprising determining a symbol rate for the channel based on the determined bandwidth.

25. The method of claim 23, further comprising determining a code rate for the channel based on the determined symbol rate.

26. The method of claim 20, wherein the channel comprises a raised-cosine pulse shape.

27. The method of claim 1, wherein placing the demodulator in a power scanning mode comprises controlling a matched filter included in the tuner to act as an anti-aliasing filter.

28. The method of claim 1, further comprising determining a finer estimate of the channel parameters.

29. The method of claim 19, wherein determining a finer estimate comprises performing a bit tracking loop lock procedure.

30. A receiver configured to act in a power scanning mode, comprising:

a demodulator configured to receive a satellite signal;

a power measurement circuit configured to determine frequency and power information for signals received by the tuner; and a processor configured to control the tuner and the power measurement circuit and to determine signal rate and channel center frequency parameters based on the frequency and power information determined by the power measurement circuit, the processor further configured to place the demodulator in a power scanning mode, to scan the frequency spectrum to obtain power samples at a plurality of frequencies, until a channel is detected, to perform channel extraction once a channel is detected, and to obtain a coarse estimate of the channel parameters associated with the detected channel, wherein the detected channel comprises a flat area, a left point of inflection, and a right point of inflection, and wherein obtaining a coarse estimate comprises measuring the power at three separate frequencies in order to determine a left point of inflection for the channel.

31. The demodulator of FIG. 30, wherein the tuner comprises a matched filter, and wherein the processor is configured to place the demodulator in the power scanning mode by controlling the operation of the matched filter.

32. The demodulator of claim 31, wherein the processor is configured to place the demodulator into a power scanning mode by controlling the matched filter to act as an anti-aliasing filter.

33. The method of claim 32, wherein the processor is configured to place the demodulator into a power scanning mode by also setting the bandwidth of the tuner to a maximum and causing the matched filter to be clocked at a clocking rate that is different from a symbol clocking rate.

34. The demodulator of claim 31, wherein the power measurement circuit comprises a phase rotator bank coupled with the matched filter, the phase rotator bank configured to accept a single input, both I and Q, from the output of matched filter and to produce multiple outputs corresponding to various frequency rotations.

35. The demodulator of claim 34, wherein the phase rotator bank is configured to accept data from the matched filter at a clocking rate used to clock the matched filter.

36. The demodulator of claim 33, wherein the power measurement circuit further comprises a low pass filter configured to low pass filter multiple streams of data.

37. A receiver configured to act in a power scanning mode, comprising:

a demodulator configured to receive a satellite signal;

a power measurement circuit configured to determine frequency and power information for signals received by the tuner; and a processor configured to place the demodulator in a power scanning mode, to scan the frequency spectrum to obtain power samples at a plurality of frequencies, until a channel is detected, to perform channel extraction once a channel is detected, and to obtain a coarse estimate of the channel parameters associated with the detected channel, wherein the detected channel comprises a flat area, a left point of inflection, and a right point of inflection, and wherein obtaining a coarse estimate comprises measuring the power at three separate frequencies in order to determine a left point of inflection for the channel.

* * * * *

UNITED STATES PATENT AND TRADEMARK OFFICE

CERTIFICATE OF CORRECTION

PATENT NO. : 8,270,896 B2
APPLICATION NO. : 12/298512
DATED : September 18, 2012
INVENTOR(S) : Prasad Shamain, Chi-Ping Nee and Gadi Kalit It is certified that error appears in the above-identified patent and that said Letters Patent is hereby corrected as shown below:

Column 14, line 17, replace “FIG.” with “claim”

Signed and Sealed this
Thirtieth Day of October, 2012

David J. Kappos
*Director of the United States Patent and Trademark Office*